Jan. 13, 1970     D. G. JONES     3,488,822
TOOL BIT LOCK

Filed Feb. 23, 1965     2 Sheets-Sheet 1

INVENTOR
DENNIS G. JONES
BY
Toulmin & Toulmin
ATTORNEYS

Jan. 13, 1970    D. G. JONES    3,488,822
TOOL BIT LOCK

Filed Feb. 23, 1965    2 Sheets-Sheet 2

INVENTOR
DENNIS G. JONES
BY
Toulmin & Toulmin
ATTORNEYS

United States Patent Office 3,488,822
Patented Jan. 13, 1970

3,488,822
TOOL BIT LOCK
Dennis G. Jones, Greensburg, Pa., assignor to Kennametal Inc., Latrobe, Pa., a corporation of Pennsylvania
Filed Feb. 23, 1965, Ser. No. 434,554
Int. Cl. B26d 1/00
U.S. Cl. 29—96            14 Claims This invention relates to tools for metal cutting and the like, and is particularly concerned with an improved tool holder including an arrangement for holding inserts in place on the tool holder.

In machine tools a preferred type cutting element is a cemented tungsten carbide member which is extremely hard and has long life but which, because of its expense and the difficulty of machining and the like, is ordinarily made in the form of a small insert mounted on a tool holder. Such inserts are sometimes cemented or brazed in place on a hard steel holder, but are most often detachably secured to the holder so that the cutting element can be replaced or indexed to a new cutting position when one portion becomes dulled.

It is in particular connection with a tool holder having means for detachably affixing a cutter insert thereto that the present invention is concerned.

A particular object of the present invention is the provision of an improved arrangement for detachably securing a cutter insert to a tool holder.

Another object of this invention is the provision of an arrangement for detachably securing a cutter insert to a tool holder which will permit rapid detachment of the cutter element from the tool holder and rapid connection of the cutter element to the tool holder.

A still further object is the provision of a structure for locking a cutter element to a tool holder in which the cutter element is tightly held on the tool holder and will remain tightly held thereon even in the presence of substantial loads on the cutter element and in the presence of vibration.

Still another object of the present invention is the provision of a locking device for locking the cutter element or the like on a tool holder in which the parts of the locking device can be simply manufactured by substantially conventional tooling.

Still another object of this invention is the provision of a locking device for locking a cutter element or the like on a tool holder or similar support so constructed and arranged that the amount of locking force that can be developed by the device can be varied.

A still further object of this invention is the provision of an arrangement for connecting a cutter element to a tool holder in which the cutter element is accurately positioned on the tool holder.

A further object of this invention is the provision of a locking device for accurately locating and retaining a cutter tool on a tool holder having a notch therein formed with intersection wall portions to provide for a high degree of accuracy for locating indexable cutter tools in said notch.

Another object of this invention is the provision of an improved arrangement for detachably securing indexable cutter tools in machining setups requiring a high degree of location of the cutter tool as in tape controlled setups.

These and other objects and advantages of this invention will become more apparent upon reference to the following specification taken in connection with the accompanying drawings, in which.

Figure 1:
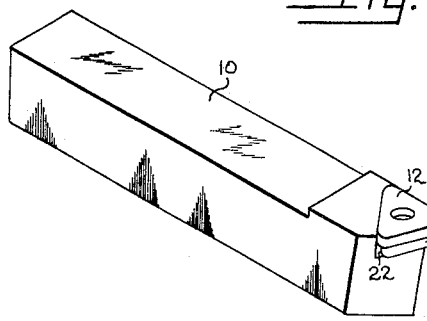
FIGURE 1 is a perspective view showing a typical tool holder and cutter element insert clamped thereto according to the present invention.

Referring to the drawings somewhat more in detail, in FIGURES 1 through 5 the tool holder is indicated at 10 and this member is notched at one end for receiving the cutter element 12 which, in the case of the figures referred to, is triangular in shape. The cutter element is in the form of an insert for being replaced readily on the tool holder or for being successively indexed thereon in order to present the three different sides to the work whereby the life of the insert is greatly increased. Normally, an insert 12 will rest on a shim or anvil 14 also disposed within the notch on the tool holder and providing an accurate seating surface for the insert which is, itself, made to extremely close tolerances.

Figure 2:
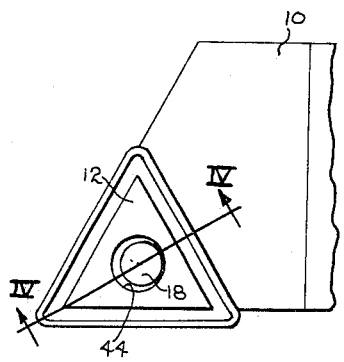
FIGURE 2 is a plan view looking down on the end of the tool holder.
Figure 4:
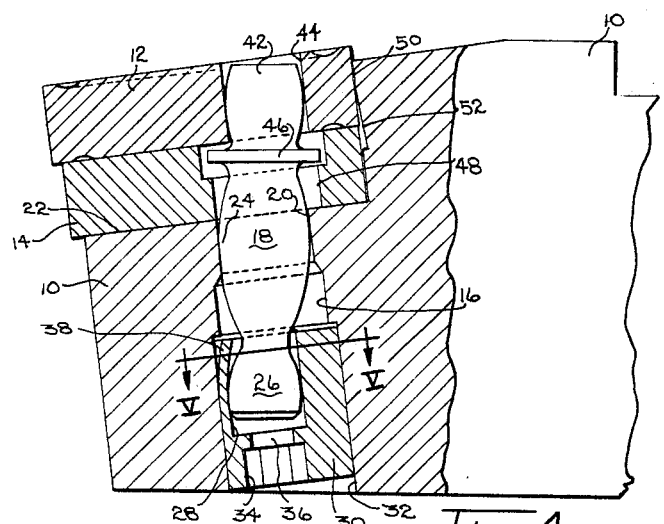
FIGURE 4 is a vertical sectional view drawn at enlarged scale and indicated by line IV—IV on FIGURE 2.
Figure 3:
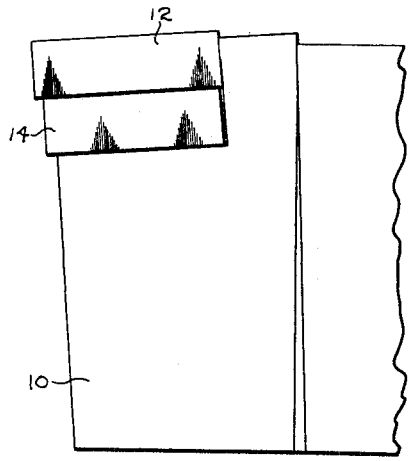
FIGURE 3 is a side view of the end of the tool holder showing the insert mounted thereon.

The relationship of the insert 12 and shim or anvil 14 in tool holder 10 will be readily seen in FIGURES 1, 2 and 3 and also in the somewhat enlarged sectional view of FIGURE 4.

Figure 5:
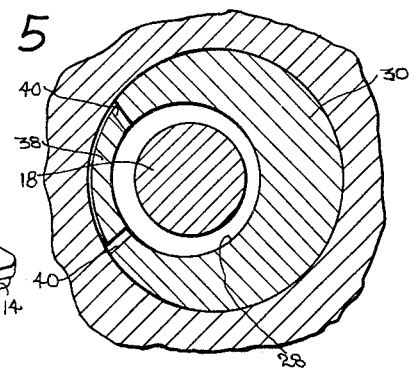
FIGURE 5 is a sectional view indicated by line V—V on FIGURE 4.

The present invention is concerned primarily with the device provided for locking insert 12 in place. This device is best illustrated in FIGURES 4 and 5 wherein it will be seen that the tool holder 10 is provided with a bore 16 in which a pin 18 is mounted. Bore 16 includes a smaller diameter portion 20 disposed at the end of the bore opening into the recess 22 of the tool holder, and pin 18 includes a region 24 of a size closely to fit within region 20. Pin 18 is thus tiltably supported within bore 16. The lower end of bore 16 is enlarged in diameter over portion 20 while pin 18, at the same time, is smaller in diameter than the region 24 and the pin is therefore tiltable a substantial amount in bore 16 so as to form a sort of lever.

Pin 18 at its lower end has a small ball-like portion 26 that fits relatively closely in eccentric bore 28 of a cup 30 that fits closely within the largest diameter portion 32 of bore 16. Co-axial with eccentric bore 28 in cup 30 is hexagonal bore 34 for receiving a wrench, and in the bottom of recess 34 is a hole 36 through which a rod can be extended to push pin 18 out of cup 30. Cup 30 is normally held in place on the ball-like end 26 of pin 18 by bending in the thin wall of cup 30 as at 38. The wall of cup 30 has slots 40 formed therein to permit this portion of the wall to be bent inwardly.

At its uppermost end pin 18 has another ball-like portion 42 which fits relatively closely in bore 44 extending through the insert 12. At the base of ball-like portion 42 is a flange 46 which is larger in diameter than portion 20 of bore 16, but smaller in diameter than shouldered bore 48 in shim or insert 14. Inasmuch as flange 46 is larger in diameter than portion 20 of bore 16, pin 18 and cup 30 are captive in tool holder 10 and will not fall therefrom when insert 12 is loosened for indexing or for being removed. Resilient portion 38 detachably retains end 26 in cup 30.

A feature of the present invention is to be observed in FIGURE 4 wherein it will be seen that the back wall of recess 22 comprises an upper portion 50 which is parallel with the back wall of insert 12 so as to be in face to face engagement therewith when the insert is locked in position. Beneath portion 50 the back wall of the notch 22 has an inclined portion 52 that provides clearance from the back wall of the insert and also from the back wall of shim or spacer 14. By this arrangement, any moments developed on insert 12 by pin 18 will draw the outer working edge of the insert downwardly into firm engagement with shim 14. This will hold insert 14 firmly in place and it will not tend to shift or to vibrate when loads are imposed thereon.

It will be appreciated that because of the outwardly convex shape of portion 42 of pin 18, the region of engagement of this portion of the pin with insert 12 is such that the force exerted on the insert always falls within the range of portion 50 of the back wall of notch 22 and is always at right angles thereto so that reliable accurate clamping of the insert is always obtained.

The tilting of pin 18 in bore 16 is accomplished by virtue of the arrangement of the various parts of the locking mechanism notably the eccentric bore 16 in cup 30. The lever is tilted when assembled in cup 30 due to the eccentricity of the bore 18, and when the cup 30 is rotated by using a wrench in hex recess 34, the rotation causes the lever to follow a preferred curvilinear motion to bring the insert against the wall portion of the notch in the holder.

A particular feature of the present invention is to be found in the fact that there is a substantial length of pin 18 between cup 30 and insert 12, because of which the pin will be somewhat resilient and the locking force on the insert will thus be maintained even under considerable loads on the insert. Because of the resilience of the pin, the locking force will be maintained even under conditions of vibration which would tend to loosen locking devices according to the prior art.

A further feature of the present invention is to be found in the fact that pin 18 is in the form of a lever and the locking force that can be developed thereby is thus subject to variation by varying the respective lengths of the arms of the lever. This can be accomplished by the positioning of the smallest diameter portion 20 of bore 16 relative to the cup 30 and insert 12. Thus, for extremely large tools where high locking forces are required, it becomes a simple matter to make the lower end of the pin substantially longer than the upper end thereof, thereby to obtain a mechanical advantage which will magnify the available locking force.

Figure 6:
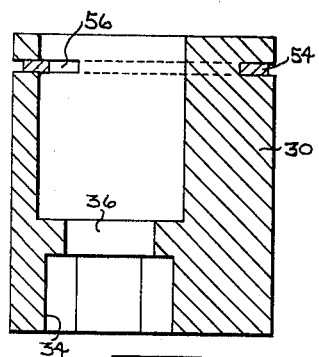
FIGURE 6 is a sectional view showing another form which the cup forming a part of the device can take.

Instead of slotting cup 30 and deforming the thin side thereof to hold pin 18 in place, the cup could have an annular groove 54 formed therein as shown in FIGURE 6, said groove cutting through the wall of the eccentric bore on one side and a resilient snap ring 56 could be placed in the bore, and which snap ring would serve resiliently to hold the cup on the lower ball-like end of the pin.

Figure 7:
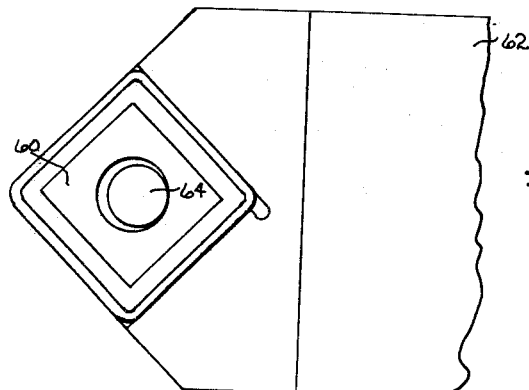
FIGURE 7 is a plan view similar to FIGURE 2 but showing a rectangular insert.

FIGURES 1 and 2 show a triangular insert, but it will be understood that the present invention is useful with all types of inserts of the conventional type, including square, circular or rhomboidal, and special shapes. FIGURE 7 shows merely by way of example how a square insert 60 could be mounted on a tool holder 62 by a locking device 64 according to the present invention.

Figure 8:
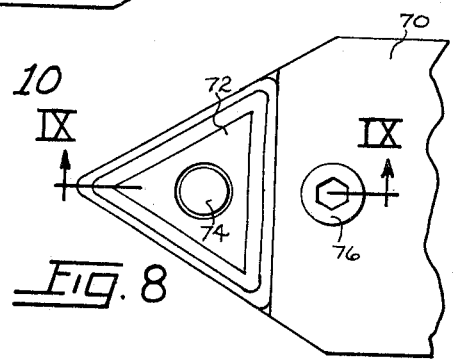
FIGURE 8 is a plan view similar to FIGURE 2 but shows the insert arranged somewhat differently on the tool holder, and also shows a different locking arrangement.
Figure 9:
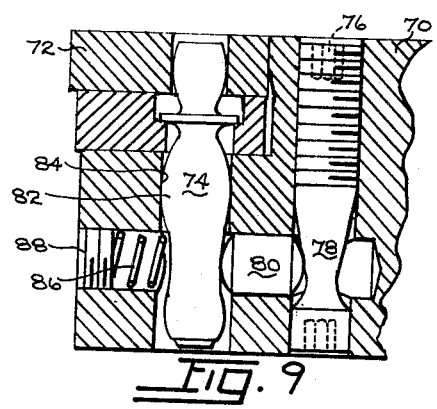
FIGURE 9 is a section on line IX—IX of FIGURE 8 showing in section the locking arrangement of FIGURE 8.

In the first described modification the tilting pin is operated by the use of a wrench on the underneath side of the tool holder. It is the case, however, that occasionally it is desired to manipulate the locking device from above the tool holder, and an arrangement of this nature is illustrated in FIGURES 8 and 9. In these figures tool holder 70 has insert 72 clamped thereto by tilting lock pin 74 which is controlled by a screw 76 accessible from the top of the tool holder. As will be seen in FIGURE 9, screw 76 has a tapered region 78 in the lower end substantially co-extensively with the lower end portion of locking pin 74. A short pin element 80 is provided in a horizontal bore in the tool holder disposed between tapered portion 78 of screw 76 and a lower portion of pin 74 beneath the part 82 of pin 84 that is fitted closely in bore 84 of the tool holder.

A spring 86 in the bore provided for pin member 80 biases pin 74 in unlocking direction and a plug 88 closes the said bore and retains spring 86 in position.

It will be evident that advancing screw 76 downwardly as viewed in FIGURE 9 will effect locking of insert 72, or withdrawing screw 76 will permit spring 86 to bias pin 74 in a direction to unlock insert 72.

Figure 10:
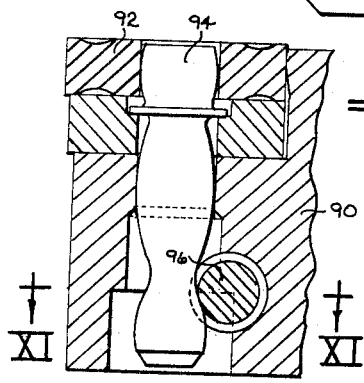
FIGURE 10 is a sectional view similar to FIGURE 9 but shows a different arrangement for actuating the lock member of the locking device.
Figure 11:
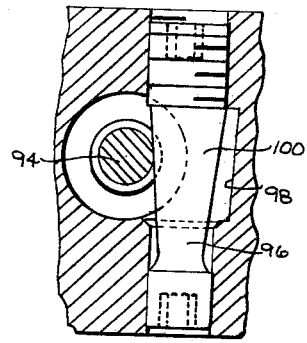
FIGURE 11 is a section taken on line XI—XI of FIGURE 10.

It may at times be desirable to actuate the locking pin from the side of the tool holder, and a construction permitting this is shown in FIGURES 10 and 11. In these figures tool holder 90 has insert 92 locked thereto by tiltable pin 94, and which pin is actuated in one direction by a screw 96 extending laterally through the tool holder through a bore 98 that intersects the bore in which tilting pin 94 is located. Tapered portion 100 on screw 96 is operable for actuating tilting pin 94 in its locking direction.

An advantage of the FIGURES 10 and 11 arrangement is that screw 96 can run through the tool holder at any angle and thus cause tilting of lock pin 94 in any direction to lock any type of insert on the tool holder. Furthermore, screw 96 can have wrench sockets in both ends thereof for actuation from either end thereof.

In all the modifications illustrated the advantage obtains of a simple construction and reliable locking with the possibility of varying the amount of the locking force by changing the proportions of the arms and locking lever and the direction of the locking force is always such to provide for firm seating of the insert in the tool holder while preventing tilting of the insert on the holder.

The advantage further exists that there is nothing upstanding from the top of the tool holder so that nothing will interfere wih chips taken by the tool holder and no part of the locking device can be damaged by the said chips.

In the first-described modification no eccentric machining of any part is required and, with the exception of the eccentric portion of the cup, all of the parts are symmetrical and can readily be machined without special fixtures or special procedures of any type.

In the last-described modifications no eccentric elements at all are employed, and thus the entire device can be made by simple conventional machining procedures.

While the locking arrangement has been disclosed and described in connection with the locking of a cutter element or insert to a tool holder, it will be understood that the locking device, consisting of the tiltable pin and the means for tilting the pin could be employed under any circumstances where a locking or clamping action of the nature referred to is required.

Another feature of the present invention is that it is especially useful on complex machinery which is tape controlled. Indexable tool inserts are especially desirable on such set ups as they minimize down time and resetting of the tool.

The embodiment shown in FIGURE 7 which has two rigid walls against which the insert may be located and held is especially compatible for the above set ups. The two walls insure maximum accuracy of location of the tool insert. As these inserts are now available with close tolerance limits and are provided with indexable cutting edges, applicant's invention provides an inexpensive, effective and accurate means for locating the insert against the two rigid walls and for detachably holding it thereagainst.

It will be understood that this invention is susceptible to modification in order to adapt it to different usages and conditions; and accordingly, it is desired to comprehend such modifications within this invention as may fall within the scope of the appended clams.

What is claimed is:

1. In combination; a tool holder having a notch in one end to receive a tool insert, said notch having a back wall, a tool insert in the notch and having a hole therein, a bore in the tool holder in substantial registration with said hole, a lever in the bore having one end portion in said hole, said lever having a region between the end portions thereof closely fitting said bore while the portions of the lever on opposite sides of said region have clearance in said bore whereby the lever is tiltable in the bore about said region, and a cup in said bore having an eccentric recess receiving the other end of said lever whereby rotation of the cup in the bore will tilt said lever to force the insert against the said back wall of the notch and will hold the lever in its tilted position.

2. In combination; a tool holder having a first surface and a wall portion joined therewith to form a notch in said holder for receiving a tool insert, said first surface having a bore therein to receive a lever, a tool insert positioned in said notch and having a bore therein in substantial alignment with said first named bore and also having a wall portion substantially conforming in shape to the wall portion of said notch, a lever having first and second ends and a region therebetween closely fitting a region in said bore of said holder, said lever and said bore of said holder having cooperating surfaces at said regions enabling said lever to be tilted about said region of said bore, said first end of said lever engaging said bore of said tool insert, and a cup member rotatably mounted in said bore of said tool holder, said cup member having a recess eccentrically located therein to receive said second end and also having a pair of spaced axially aligned substantially radial slots on the periphery thereof to form a resilient portion which is bent towards the axis of the cup member to retain said second end of said lever in said recess, and means in said cup member for rotating it in said bore of said tool holder.

3. In combination; a tool holder having a first surface and a wall portion joined therewith to form a notch in said holder for receiving a tool insert, said first surface having a bore therein to receive a lever, a tool insert positioned in said notch and having a bore therein in substantial alignment with said first named bore and also having a wall portion substantially conforming in shape to the wall portion of said notch, a lever having first and second ends and a region therebetween closely fitting a region in said bore of said holder, said lever and said bore of said holder having cooperating surfaces at said bore, said first end of said lever engaging said bore of said tool insert, a cup member rotatably mounted in said bore of said tool holder, said cup member having a recess eccentrically located therein to form a thin wall portion and also having a groove formed on the periphery thereof, said groove communicating with said recess in the region of said thin wall portion, a resilient ring positioned in said groove to detachably retain said second end in said recess, and means on said cup member for rotating it in said bore of said tool holder.

4. In combination; a tool holder having a first surface and a wall portion joined therewith to form a notch in said holder for receiving a tool insert, said tool holder having a bore opening through said first surface to receive a lever, a tool insert positioned in said notch and having a hole therein in substantial alignment with said bore in said tool holder and also having a wall portion substantially conforming in shape to the wall portion of said notch, a lever having first and second ends smaller in diameter than said bore and a bulbous region therebetween larger in diameter than said ends and closely fitting a region in said bore of said holder so the lever is tiltable in said bore, said first end of said lever also being bulbous and engaging said hole in said tool insert with clearance so the insert can be dropped into or lifted out of said notch without removing said lever from said bore, and cam means rotatable in said tool holder and having a cam surface operatively engaging said second end of said lever on the side of the lever facing said wall portion of said notch and rotatable in the holder to tilt said lever in said bore thereby causing said first end to force said tool insert against said wall portion of said notch and to clamp it thereagainst.

5. The combination as claimed in claim 4 in which said cam means in said tool holder operatively engaging said second end of said lever comprises, a screw member threadedly received in said tool holder, said cam surface comprising a tapered portion on said screw member operatively engaging said second end of said lever to tilt said lever in said bore upon rotation of said screw in said holder.

6. The combination as claimed in claim 4 in which said cam means in said tool holder operatively engaging said second end comprises a screw member threadedly received in said tool holder and having said cam surface comprising a tapered portion on said screw, said tool holder having a further bore therein communicating with said first-named bore, and a pin element slidably mounted in said further bore and having one end engaging said second end of said lever and the other end engaging said tapered portion on said screw so rotation of the screw in the holder will tilt said lever in said first-named bore.

7. The combination as claimed in claim 6 further comprising spring means slidably positioned in said further bore and engaging said second end of said lever on the opposite side of said lever from said pin to resiliently tilt said lever in a direction opposed to said tilting by said pin element, and plug means threadedly received in said further bore to retain said spring means therein.

8. The combination as claimed in claim 1 further comprising a generally planar shim element positioned in said notch beneath said tool insert and having a bore therein in substantial alignment with the said bore in said tool insert, the bore in said shim element being counterbored from the tool insert end thereof, said lever being generally cylindrical in shape and having a radial flange thereon adapted to be received in said counterbore and larger than the bore in said shim element to prevent said lever from falling through the bore of said shim element and said tool holder when said tool holder is positioned with said notch or tip.

9. The combination as claimed in claim 1 in which said back wall of said tool holder is substantially planar and is substantially perpendicular to the bottom wall of said notch.

10. The combination as claimed in claim 9 in which said back wall of said notch is formed of intersecting wall sections disposed at angles to each other.

11. The combination as claimed in claim 1 in which said lever is round in transverse cross section and has arcuately shaped peripheries at the ends and at said region therebetween.

12. A locking device for securing a first tool element to a second tool element in which said second element has a first surface and a wall portion joined therewith to form a notch in said second element, said second element having a cylindrical bore therein opening through said first surface to receive a lever, said first element being positioned in said notch and having a cylindrical bore therein in substantial alignment with said first named bore and also having a wall portion substantially conforming in shape to said wall portion of said notch, a lever having first and second bulbous ends and a bulbous region between said ends closely fitting a region of said first named bore enabling said lever to be tilted in said bore, said first end of said lever extending loosely into said bore of said first element, from the side of said first element facing said first surface and cam means in said second element engaging said second end to tilt said lever causing said first end to force said first tool element against said wall portion of said second element and hold it thereagainst.

13. In combination; a tool holder having a notch in one end to receive a tool insert, said notch having a bottom wall and a back wall, a tool insert resting on the bottom wall of the notch and having a hole extending therethrough perpendicular to said bottom wall, a bore in the tool holder in substantial registration with said hole, a lever in the bore having opposite end portions with one end portion extending into said notch so as to be receivable in said hole, said one end portion being bulbous and smaller in diameter than said hole so the insert can be placed in the notch and removed therefrom by movement thereof axially of said lever while said lever remains in said bore, said lever having a bulbous central region between the end portions thereof closely fitting said bore substantially larger in diameter than said end portions and whereby the lever is tiltable in the bore about said central region, and cam means rotatably carried by the tool holder and having a cam surface operatively engaging said lever in a region thereof which is on the opposite side of said central region from said one end portion of the lever and on the side of the lever which faces said back wall of the notch, said cam means being operable in response to rotation thereof in said tool holder for tilting said lever in said tool holder to cause the said one end portion of said lever to force the insert against the back wall of the notch and to clamp the insert tightly against said back wall.

14. A tool holder according to claim 13 which includes means on said lever near said one end portion larger than said bore to prevent said lever from dropping downwardly in said bore when loosened from locking engagement with said insert.

References Cited

UNITED STATES PATENTS

| | | | |
|---|---|---|---|
| 3,137,059 | 7/1964 | Hertel | 29—96 |
| 3,226,797 | 1/1966 | Hertel | 29—96 |
| 3,238,600 | 3/1966 | Milewski | 29—96 |

HARRISON L. HINSON, Primary Examiner